(12) United States Patent
Jackson et al.

(10) Patent No.: US 8,621,012 B2
(45) Date of Patent: Dec. 31, 2013

(54) ACTIVE E-MAILS

(75) Inventors: Todd Jackson, San Francisco, CA (US); Jonathan D. Perlow, San Francisco, CA (US); Edward S. Ho, Palo Alto, CA (US); Andrew A. Bunner, Belmont, CA (US); Henry Y. Wong, Santa Clara, CA (US); David M. Cohen, Mountain View, CA (US); Bruce J. Dibello, San Francisco, CA (US); John Pongsajapan, San Francisco, CA (US); Braden F. Kowitz, San Francisco, CA (US); Patrick A. Barry, San Francisco, CA (US); Michael H. Leggett, Mountain View, CA (US)

(73) Assignee: Google Inc., Mountain View, CA (US)

( * ) Notice: Subject to any disclaimer, the term of this patent is extended or adjusted under 35 U.S.C. 154(b) by 302 days.

(21) Appl. No.: 12/702,073

(22) Filed: Feb. 8, 2010

(65) Prior Publication Data

US 2011/0196933 A1 Aug. 11, 2011

(51) Int. Cl.
*G06F 15/16* (2006.01)
(52) U.S. Cl.
USPC .......................................... 709/206; 709/204

(58) Field of Classification Search
USPC .................. 709/203, 204, 206, 207, 217, 219
See application file for complete search history.

(56) References Cited

U.S. PATENT DOCUMENTS

| | | | |
|---|---|---|---|
| 7,865,830 B2 * | 1/2011 | Kim et al. ..................... | 715/713 |
| 2007/0136354 A1 | 6/2007 | Chen | |
| 2007/0214216 A1 * | 9/2007 | Carrer et al. .................. | 709/204 |
| 2008/0155080 A1 | 6/2008 | Marlow et al. | |
| 2009/0013046 A1 * | 1/2009 | Lee et al. ...................... | 709/206 |
| 2009/0063636 A1 * | 3/2009 | Heidloff et al. ............... | 709/206 |
| 2009/0157693 A1 | 6/2009 | Palahnuk | |
| 2009/0157819 A1 * | 6/2009 | Hampton ...................... | 709/206 |
| 2009/0248806 A1 | 10/2009 | Teman | |
| 2009/0271283 A1 | 10/2009 | Fosnacht et al. | |
| 2010/0250683 A1 * | 9/2010 | Hoyne et al. .................. | 709/206 |
| 2011/0035681 A1 * | 2/2011 | Mandel et al. ................ | 715/752 |

OTHER PUBLICATIONS

Authorized officer Lee W. Young, International Search Report and Written Opinion in PCT/US2011/20644, mailed Aug. 26, 2011, 7 pages.

* cited by examiner

*Primary Examiner* — Barbara Burgess
(74) *Attorney, Agent, or Firm* — Fish & Richardson P.C.

(57) ABSTRACT

A computer-implemented method can include accessing a micro-blog to retrieve a real-time copy of the micro-blog thread and delivering the real-time copy of the micro-blog thread for display in an e-mail message.

19 Claims, 12 Drawing Sheets

ACTIVE E-MAILS

TECHNICAL FIELD

This document generally describes systems, computer program products, and methods for integrating micro-blog postings and activities with a user's electronic mail (e-mail).

BACKGROUND

In recent years, micro-blogging has increased in popularity. In general, micro-blogging allows a user to broadcast relatively short messages to a group of people associated with the user. In a micro-blogging system, the user generates a submission (referred to herein as a post) that is re-transmitted to the group of people who have been associated with the user. Based on the user's post, other users may comment or add additional information in response to the post generating a series of posts (referred to herein as a thread).

SUMMARY

This document describes techniques for integrating micro-blog postings and activities with a user's e-mail. The techniques can include delivering micro-blog threads with which a user is involved (e.g., comments on the user's posts, posts to which the user has subscribed, comments on threads in which the user has commented, and/or @replies) directly to the user's e-mail inbox. The micro-blog posts in the user's e-mail are not static e-mails; rather, they are "live" objects that allow micro-blogging actions to be performed from the user's e-mail. The e-mail messages associated with the micro-blog include a dynamic object (e.g., a piece of code that executes at run-time) embedded in the message that provides micro-blogging functionality in the e-mail message. For example, the user can comment on and/or 'like' a post directly from his/her e-mail. Actions performed in the e-mail message are automatically reflected on the micro-blog. Because the e-mail is not static, new updates to the thread on the micro-blog are reflected in real-time in the user's inbox.

In one implementation, a computer-implemented method of delivering content from a micro-blog to an e-mail message in a user's e-mail includes receiving a request from a user to view an e-mail message associated with a thread in a micro-blog. The method also includes, accessing the micro-blog to retrieve a real-time copy of the micro-blog thread and delivering the real-time copy of the micro-blog thread for display in the user's e-mail message.

Embodiments can include one or more of the following.

The e-mail message can include an embedded dynamic object associated with the thread in the micro-blog. Acessing the micro-blog can include accessing the micro-blog based on the embedded dynamic object. The method can also include updating, in real time, micro-blog entries rendered in the e-mail based on updates to the thread in the micro-blog. The method can also include updating entries to the micro-blog thread based on received user input from the user's e-mail application. Updating entries to the micro-blog thread based on received user input from the user's e-mail application an include providing a text entry box associated with the e-mail message, receiving a user input from the text entry box, and in response to the received user input, posting the received user input to the micro-blog. Updating entries to the micro-blog thread based on received user input from the user's e-mail application can include providing a link in the e-mail message configured to enable a user to provide a 'like' indication by selection of the link, receiving a 'like' indication from the user, and posting the 'like' indication to the micro-blog. The method can also include enabling the user to view the video inline with the e-mail message. The method can also include displaying images associated with the micro-blog entry inline with the e-mail message. The method can also include in response to a user selection of an image displaying an increased size view of the image. The method can also include filtering micro-blog entries to determine a subset of entries to deliver as e-mail messages to a particular user. The method can also include storing a static copy of the micro-blog thread. The method can also include receiving a search request from a user and searching micro-blog threads based on the received search.

In some additional aspects, an electronic system for delivering content from a micro-blog to an e-mail message in a user's e-mail can include a memory and a processor. The processor can be configured to receive a request from a user to view an e-mail message associated with a thread in a micro-blog, access the micro-blog to retrieve a real-time copy of the micro-blog thread, and deliver the real-time copy of the micro-blog thread for display in the user's e-mail message.

Embodiments can include one or more of the following.

The e-mail message can include an embedded dynamic object associated with the thread in the micro-blog and the processor can be configured to access the micro-blog based on the embedded dynamic object. The processor can be configured to update, in real time, micro-blog entries rendered in the e-mail based on updates to the thread in the micro-blog. The processor can be configured to provide a text entry box associated with the e-mail message, receive a user input from the text entry box, and in response to the received user input, post the received user input to the micro-blog. The processor can be configured to provide a 'like' indication by selection of the link, receive a 'like' indication from the user, and in response to the received user input, post the 'like' indication to the micro-blog. The processor can be configured to enable the user to view the video inline with the e-mail message. The processor can be configured to store a static copy of the micro-blog thread and access the stored copy of the micro-blog thread in response to a search request.

In some additional aspects, an electronic system for delivering content from a micro-blog to an e-mail message in a user's e-mail can include a memory, a processor, and means for accessing a micro-blog and delivering a real-time copy of a micro-blog thread to a user's e-mail in response to a user request.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

This document describes techniques for integrating micro-blog postings and activities with a user's e-mail. In general, a micro-blog is a system/process of submitting relatively short posts (e.g., a user submissions) that are automatically broadcast to a group of people who have been associated with the user. Micro-blogs encourage other users to comment on a post thereby generating a thread or a series of posts that are correlated with each other. People can become associated with a particular user, topic, or thread by subscribing to follow the user, topic, or thread. Subscribing is an act by a user of showing an intent to receive posts from a particular thread, from a particular user (e.g., you become a "follower" of the user), or to a particular topic.

While, some social/sharing services or micro-blogs send e-mail notifications to users of new sharing activity, these e-mails are static (e.g., provide a snap-shot of the activity on the micro-blog at the time the e-mail message was sent), and do not enable the user to participate in conversations by commenting or 'liking' the item directly from the e-mail message. When activity is delivered as a static e-mail message, the user is often forced to click on a link to return to the originating site to participate in the thread. The techniques described herein include delivering micro-blog threads with which a user is involved (e.g., comments on the user's posts, comments on threads in which the user has commented, posts to which a user has subscribed, and/or @replies) directly to the user's e-mail as "live" objects that allow micro-blogging actions to be performed from the user's e-mail. Because the e-mail message associated with the micro-blog posting is not static, new updates to the micro-blog thread are reflected in real-time in the user's e-mail.

Figure 1:
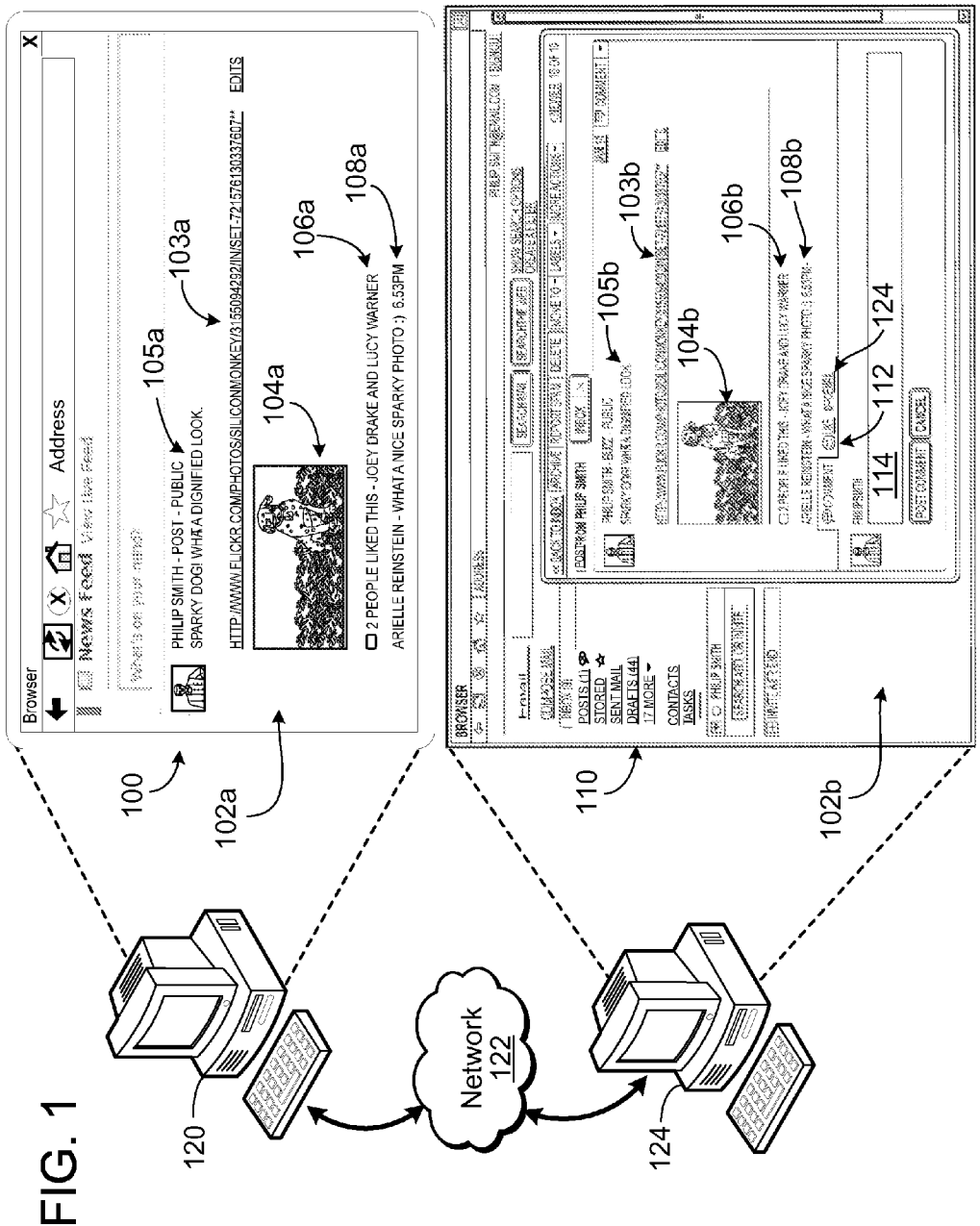
FIG. 1 is a diagram of multiple client systems interacting with a micro-blog.

FIG. 1 is a diagram of multiple client systems 120 and 124 interacting with a micro-blog in different manners. Client system 120 is interacting with the micro-blog by directing a web browser to the website of the micro-blog while client system 124 is interacting with the micro-blog from within an active e-mail message. The same functionality is available to the users of client system 120 and 124 even though one user is interacting with the micro-blog directly on the micro-blog's website and the other is interacting with the micro-blog through an e-mail application. Client systems 120 and 124 are communicatively connected by a network such as the Internet.

User interface 100 displayed on client system 120 shows a user interface for a micro-blog website. A user views the micro-blog by navigating his/her web browser to a website associated with the micro-blog. At the micro-blog website, the user can interact with the micro-blog by commenting on previous posts, 'liking' a post, and/or generating a new post. In the exemplary micro-blog shown on user interface 100, the micro-blog includes a thread 102a initiated by Philip Smith that includes text posted by Philip Smith 105a, a link to a website 103a, and a picture 104a. Other activity associated with the thread including an indication of other users who 'like' the post 106a and a comment posted by another user 108a is also displayed on the micro-blog.

While a user can interact with the micro-blog by navigating his/her web browser to the website associated with the micro-blog (as shown in user interface 100), it can be beneficial to enable direct interaction with the micro-blog from the user's e-mail by delivering micro-blog threads in which a user is involved directly to the user's e-mail as a "live" or dynamic e-mail message (as shown in user interface 110). Since the e-mail message delivered to the user's e-mail (e.g., delivered to the user's inbox) includes an embedded dynamic object, the user can perform micro-blogging actions directly from his/her e-mail such as posting a comment to the thread and/or liking the post.

The user interface 110 shows an e-mail message that includes live content from a micro-blog thread. The thread 102a from the micro-blog appears as an e-mail message 102b in the user's inbox. The e-mail message 102b includes the current content for the thread available on the live micro-blog including the text 105b, link 103b, picture 104b, the indication of other users who 'like' the post 106b, and the additional comment posted by another user 108b. The e-mail message also includes a user input block 114 that allows the e-mail user to post additional comments to the micro-blog thread. When the user types text into the user input block 114 in the e-mail message, the text is posted to the micro-blog as an additional entry in the micro-blog thread. Additional micro-blogging functionality is available in the e-mail application such as a link 112 that a user clicks on to 'like' the post and a link 124 the user clicks on to e-mail the post.

Figure 2:
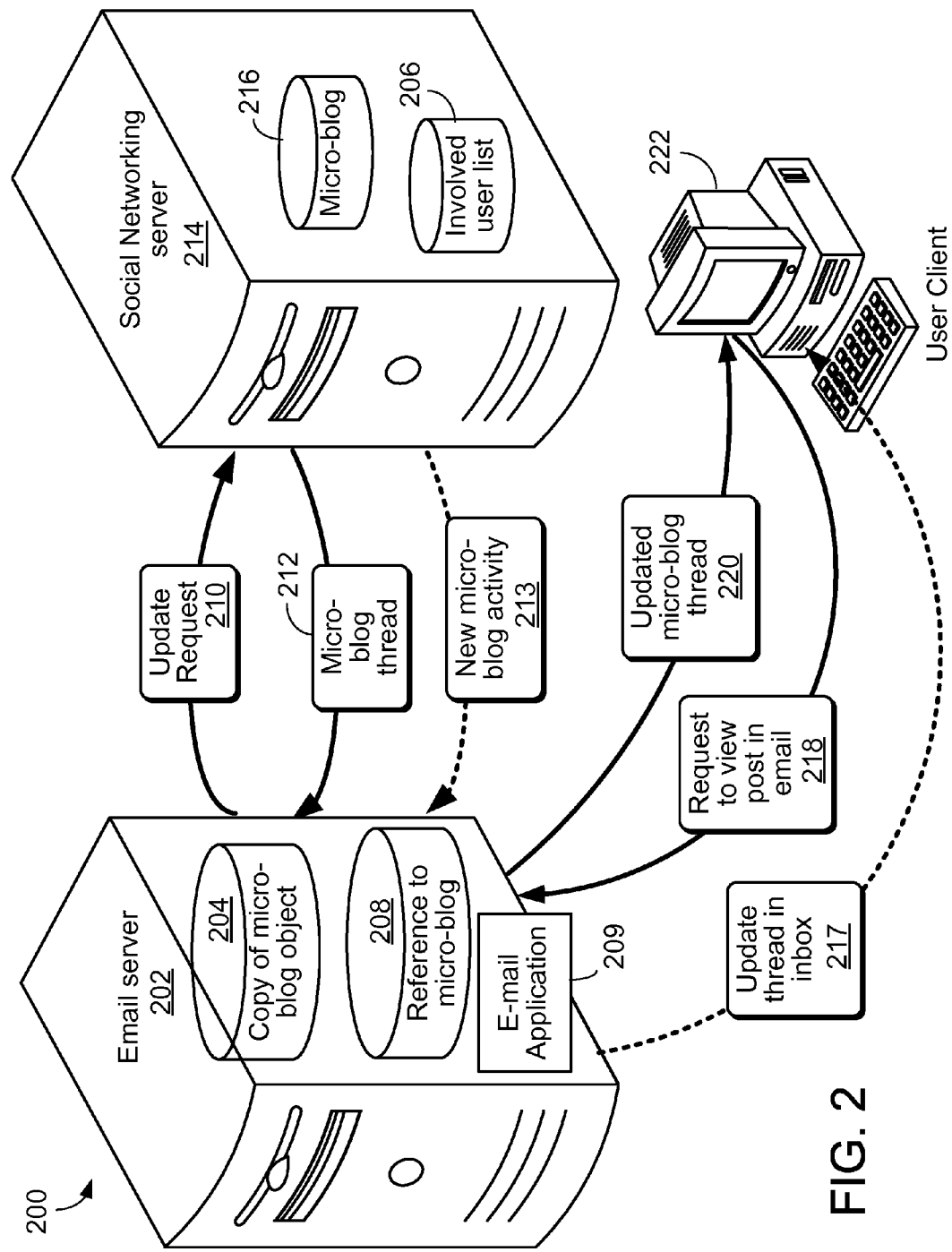
FIG. 2 is a block diagram of a system for integrating micro-blog postings and activities with a user's e-mail.

FIG. 2 is a block diagram of a system 200 for integrating a micro-blog with a user's e-mail such that micro-blog threads are delivered directly to the user's inbox as "live" objects and new updates to these threads are reflected in real-time in the user's e-mail. The system 200 includes a user client computing device 222, an e-mail sever 202, and a social networking server 214.

The user client 222 is a computer system or other computing device (e.g., a mobile telephone, mobile computer, etc.) that enables a user to view e-mail messages and interact with an e-mail application. The user client 222 is communicatively connected to the e-mail server 202 via a network.

The e-mail sever 202 is configured to maintain a user's e-mail. E-mail server 202 includes an e-mail application 209. E-mail server 202 also includes logic or software for delivering and displaying active content associated with a micro-blog in an e-mail message.

When a new comment is added to the micro-blog thread or other activity occurs in the micro-blog thread, the social networking server distributes or updates e-mail messages to each of the users in an involved user list stored on the social networking server 214. E-mail messages and updates from the micro-blog are received by the email server 202 from the social networking server 214 as a message with two different e-mail parts (e.g., MIME parts). The first part is a plain HTML part that displays the post content with photos, links, etc but is static and non-interactive. Based on the plain HTML part, the e-mail server 202 maintains (e.g., stores in a memory) a static copy of the micro-blog thread 204. The e-mail server 202 accesses the stored copy of the micro-blog thread in response to a user searching his/her e-mail for a particular string of text. As such, the user can search both e-mail messages and micro-blog threads from his/her e-mail application. Additionally, when a user on an e-mail application that is not able to view the active mail receives one of these messages, the update to the micro-blog appears as a normal e-mail message and the plain HTML part (e.g., the static copy) is viewed by the e-mail user. The second alternative mime part is a specially formatted version of the post which can be interpreted by e-mail clients that support active emails. The second alternative mime part includes a reference 208 to the actual micro-blog for a thread delivered to the user's e-mail. The e-mail server uses this reference 208 to pull live content from the micro-blog and render the active content (rather than rendering a static message) in response to a user request to view an e-mail message associated with the micro-blog. As such, when an email client that is capable of viewing active content receives a message associated with the micro-blog, it finds the alternative mime part (e.g., the reference 208) and uses that to render the interactive content (e.g., by fetching updates from the social network). The social network server 214 includes software for managing and updating a micro-blog. The social network server 214 receives posts from users and generates new entries in the micro-blog based on the user-generated postings. In order to determine which micro-blog threads to deliver to the e-mail account for a particular e-mail user, the social network server 214 maintains a list of "involved users" 206 for a particular thread in the micro-blog. The list of involved users 206 indicates which users should receive updates to the micro-blog thread via e-mail messages generated by the social network server 214. The social network server 214 is communicatively connected to the e-mail server 202 and sends e-mail messages to the users in the involved user list 206 related to the micro-blog to the e-mail server 202.

In operation, e-mail messages associated with micro-blog activity are not rendered in the same manner as a typical static e-mail message. When a user clicks on a static e-mail message, a request is sent to the e-mail server 202, the e-mail server accesses a stored copy of the content, and the content is rendered on the client system 222. In contrast, when a user whose email is configured to display active content clicks on an e-mail message associated with a micro-blog thread, the actual live activity is fetched from the social networking server 214 based on the stored reference 208 to the micro-blog (e.g., rather than fetching a stored static version of the thread from a memory in the e-mail server 202) and rendered on the client system 222. The live content from the social networking server 214 is provided to the user in the e-mail message, so the user has full interactivity with the micro-blog thread as if he/she was viewing the thread on the website associated with the micro-blog.

More particularly, when a user clicks on or selects to view an e-mail message associated with a micro-blog thread, the user client 222 sends a request 218 to view the e-mail message to the e-mail server 202. The e-mail server accesses a reference to the micro-blog 208 and sends an update request 210 to the social networking server 214. In response, the social networking server 214 sends the live content for the micro-blog thread 212 to the e-mail server 202 and the updated micro-blog thread 220 is delivered to the user client in the e-mail message. As such, in response to a user-request, the e-mail server 202 pulls content from the social networking server 214 for display at the user client 222.

Updates to micro-blog threads are also automatically sent (e.g., pushed) to the user's e-mail based on the involved user list 206. For example, if a micro-blog thread is updated (e.g., by another user adding a new comment or liking the thread) the social networking server 214 sends an indication 213 of the activity to the e-mail server 202 in the form of e-mail messages to each of the users in the involved user list 206. The e-mail server 202 updates the stored copy of the micro-blog thread 204 and sends an update to the thread 217 in the form of an e-mail message to the user. Furthermore, if the user is viewing the e-mail associated with the thread at the time the update is received by the e-mail server 202 (e.g., if the user has the e-mail message open and is viewing the micro-blog entry), the new micro-blog activity is updated and displayed in real-time in the e-mail message. The content of the e-mail message is updated in real time by maintaining an open connection from the user's browser running on the client system 222 to the e-mail server 202.

Figure 3A:
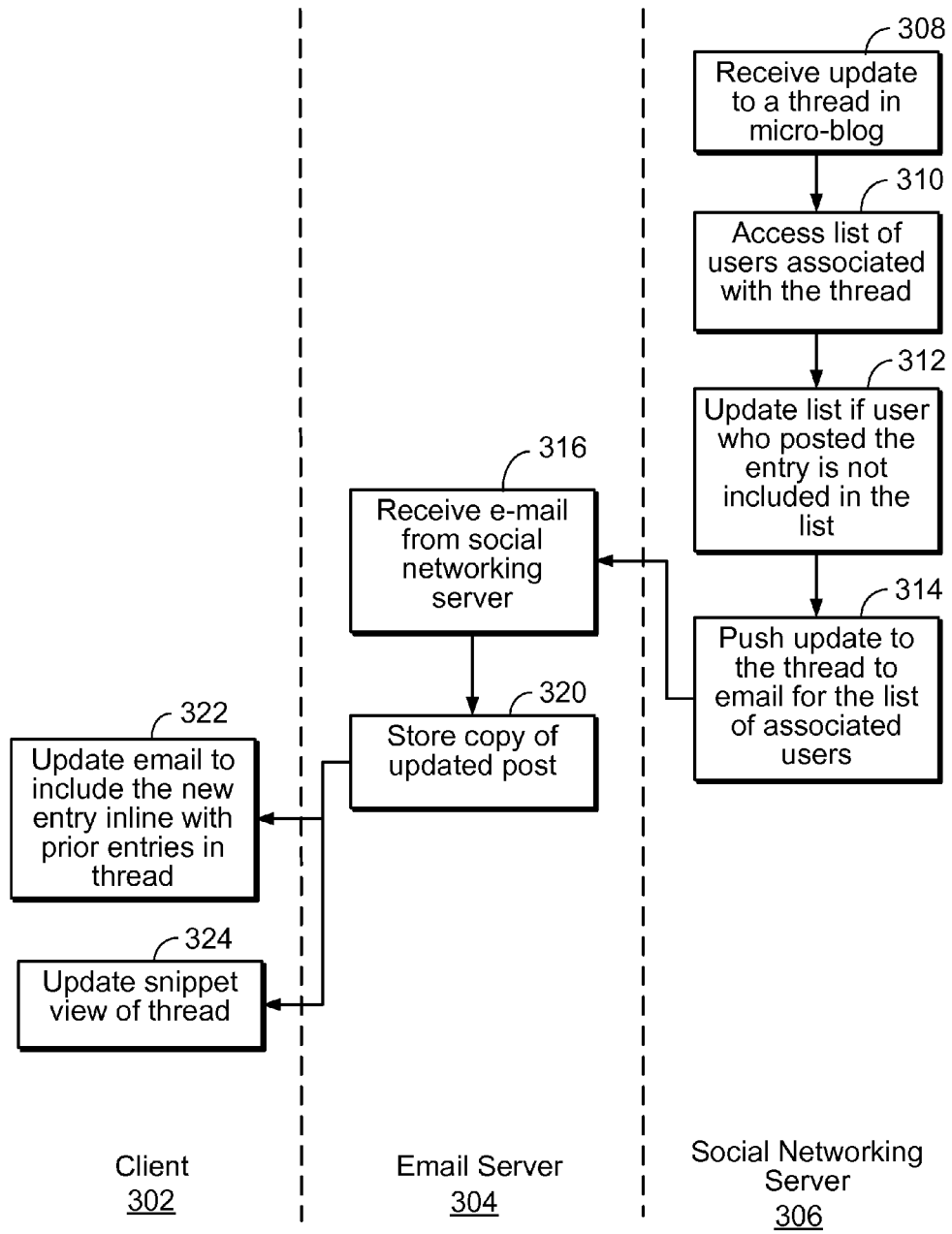
FIG. 3A is a flowchart showing actions taken to update an e-mail message based on activity or postings in a micro-blog.

FIG. 3A is a flowchart showing actions taken by a client system (as shown in column 302), an e-mail server (as shown in column 304), and a social networking server (as shown in column 306) to update an e-mail message in a user's e-mail based on activity or postings in a micro-blog maintained on the social networking server.

At box 308, the social networking server receives an update to a thread in a micro-blog. Exemplary updates include edits to an existing micro-blog entry, comments posted in response to a micro-blog entry, and/or other indications posted in response to a micro-blog entry such as a user responding that they 'like' or 'dislike' the post. The updates can be received via various communication channels such as an entry made on the website associated with the micro-blog, an update made from a user's e-mail, and/or an update made from a mobile device such as a mobile telephone.

At box 310, the social networking server accesses a list of users associated with the thread stored in a memory in the social networking server. The social networking server determines whether the individual who made the update to the thread is included in a list of users associated with the thread, and if not, the social networking server updates the list of users involved in the thread at box 312 to include the user who made the update. If the user who made the update is already included in the list of involved users, the involved user list does not need to be amended. If the thread is a new thread, only the user who generated the thread will be added to the list of users associated with the thread.

At box 314, the social networking server generates and sends (the update to the micro-blog thread in the form of e-mail messages to the users in the list of involved users. At box 316, the e-mail server receives the e-mails from the social networking server for each of the users in the involved user list. The e-mail message sent by the social networking server includes two different e-mail parts (e.g., MIME parts). The first is a plain HTML part that displays the post content with photos, links, etc but is static and non-interactive. The second alternative mime part is a specially formatted version of the post which can be interpreted by mail clients that support active emails. When a user of an active email client receives the message, the alternative mime part is used to render the interactive content (including fetching updates from the social network). If a user on a normal email client (e.g., a email client not capable of displaying active content) receives one of these messages, it appears as a normal email. The plain HTML part is also used to enable searching of micro-blog postings from the e-mail application. The plain HTML part of the micro-blog entry can also be used in the generation and display of the snippet view (e.g., as described in relation to FIG. 4A).

At box 320, the e-mail server stores a copy of the updated post.

In response to receiving an update from the e-mail server, the client system updates the body of an e-mail message to include the new updates to the micro-blog thread inline with the prior entries in the thread (box 322). This update is viewed by the user in real time because an open connection is maintained between user's browser and the e-mail server. If the user is not currently viewing the e-mail message associated with the thread, when the user accesses the thread, the system will access the live content from the micro-blog server based on the reference stored in the e-mail server and display the most up-to-date version of the micro-blog thread. If the user is not currently viewing the thread, the system updates the snippet view of the thread to display an indication that a new update to the thread has been received (at box 324). For example, a new e-mail message can be added to the user's inbox and/or a previous e-mail message can be updated to show that a new comment has been received and to change the status of the e-mail message from read to unread.

Figure 3B:
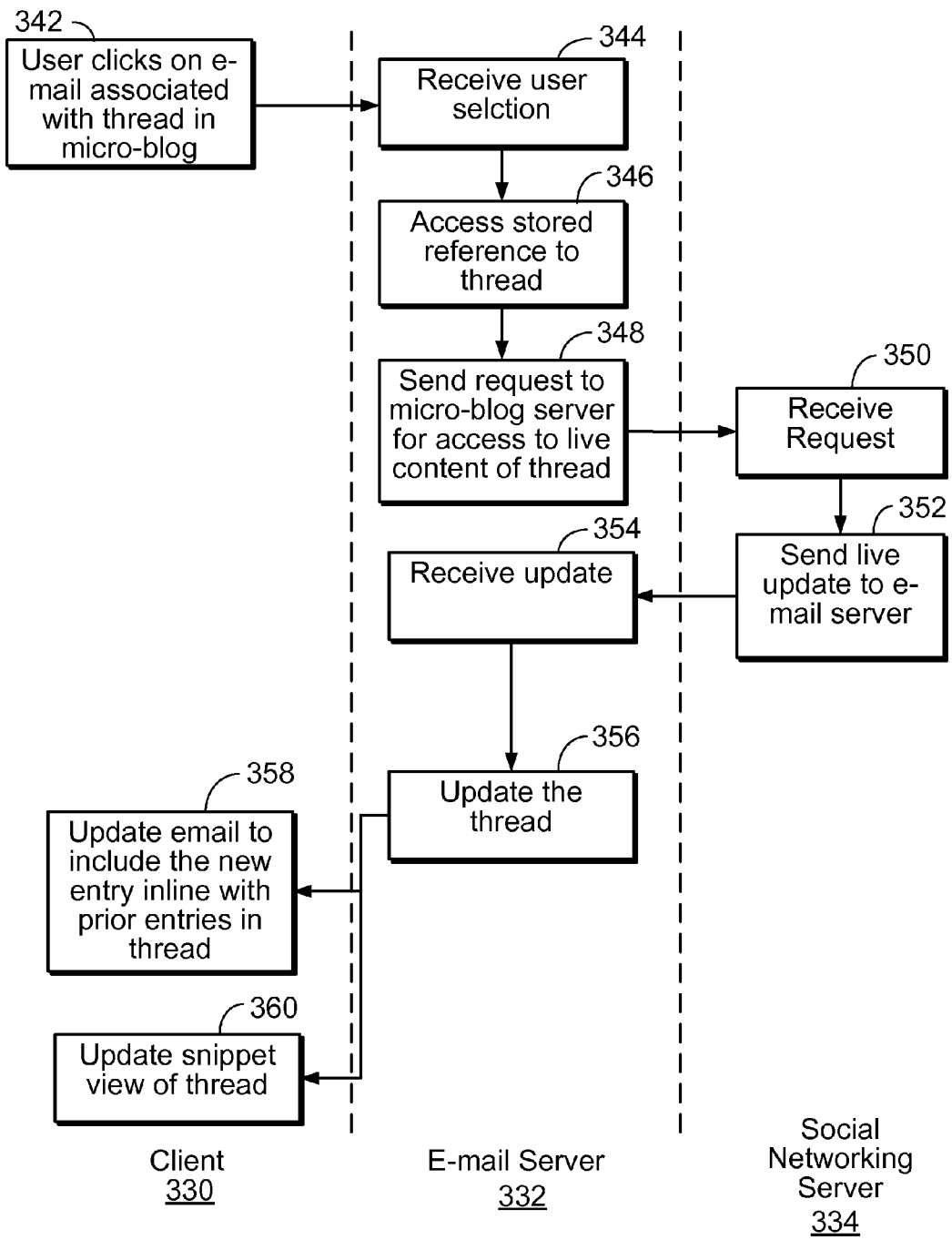
FIG. 3B is a flowchart showing actions taken in response to a user selecting to view an e-mail message associated with a micro-blog posting.

FIG. 3B is a flowchart showing actions taken by a client system (as shown in column 330), an e-mail server (as shown in column 332), and a social networking server (as shown in column 334) in response to a user selecting to view an e-mail with micro-blog content. In the example shown in FIG. 3B, the email client of the client system is configured to display active content. For email clients that do not have an email application capable of viewing active email, a plain HTML version (e.g., a static and non-interactive version) of the post content including text, photos, links, etc is displayed to the user.

At box 342, the client system receives a user selection of an e-mail message associated with a thread in the micro-blog. For example, the user can click on a snippet view of the e-mail message (e.g., a summary view where e-mail messages in the user's inbox are displayed as a lines with summary information in the user's e-mail inbox) to view the e-mail message associated with the micro-blog thread. The snippet view displays a portion of the micro-blog post such as the first few words of the post or a title.

At box 344, the e-mail server receives the user selection and at box 346 the e-mail server accesses a stored reference to the micro-blog. The e-mail server sends a request to the social networking server at box 348 to access live content for the thread from the social networking server. In contrast, when a user selects to view an e-mail message not associated with a micro-blog posting the e-mail server accesses a static copy of the e-mail message stored on the e-mail server and returns the stored copy to the user's system.

At box 350, the social networking server receives the request and at box 354, the social networking sends an update with live content for the thread to the e-mail server. At box 352, the e-mail server receives the live update from the social networking server and provides the update to the client system. Since the e-mail server accesses and receives live content from the social networking server, the micro-blog thread displayed to the user is up-to-date and includes the latest activity in the thread.

At box 358, the e-mail message including the micro-blog thread is updated to display live content from the micro-blog. Postings in the micro-blog thread are displayed inline with the e-mail and in a single message. If additional entries to the micro-blog thread are received while the user is viewing the e-mail, the comments or new activities are appended to the micro-blog thread in the e-mail message in real time. The real time update can be signaled by a visual and/or audio indicia. For example, the user could view an animated addition of the new comment and the comment can be appended to the existing comments for the thread.

At box 360, the client system also updates the snippet view of the thread to indicate any new activity such that when the user exits from viewing the e-mail message the snippet view is updated.

Figure 4A:
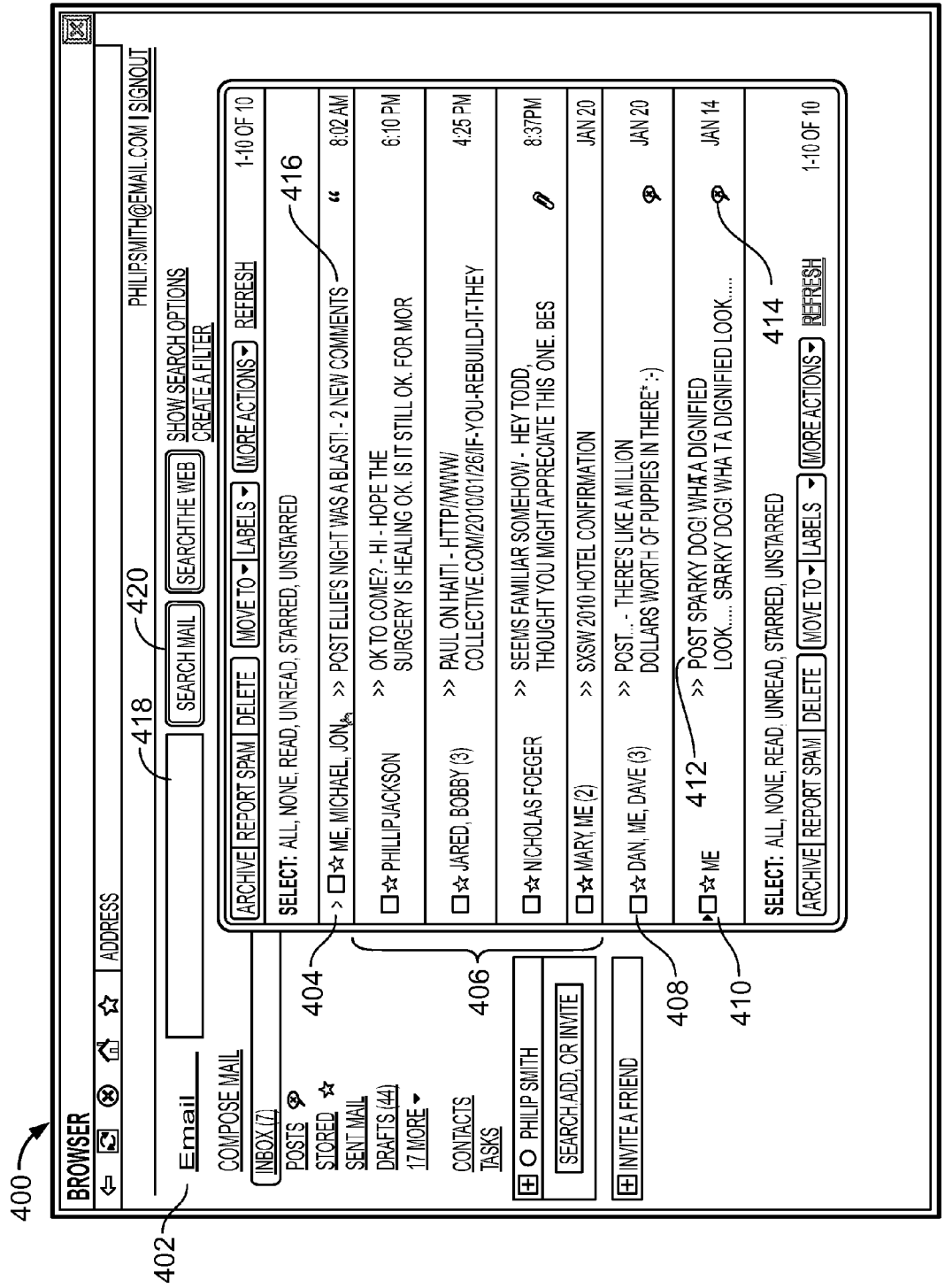
FIG. 4A is an exemplary user interface showing snippet view of an e-mail application.

FIG. 4A is an exemplary user interface 400 showing snippet view of an e-mail inbox. The snippet view displays summary information for messages in the user's inbox including the names of the individuals involved in the message string and a title and/or short text from the message. Both standard text based e-mail messages and e-mail messages associated with micro-blog activities are provided in the user's e-mail system. For example, messages associated with micro-blog activity (e.g., messages 404, 408 and 410) are displayed in the user's inbox along with other e-mail messages (e.g., messages 406). The snippet entries for micro-blog related messages can include an indication in the title for the entry (e.g., indication 412) and/or a visual indicator (e.g., indicator 414) to enable a user to quickly determine that the entry is related to a micro-blog thread. By providing an indication that the e-mail message is associated with the micro-blog in a field other than the sender, the snippet view can display the name(s) of the individuals involved in the micro-blog thread. In other examples, the name of the social networking website associated with the micro-blog can appear as the sender for the message. The entries for the micro-blog related messages can additionally include an indication of the number of new comments to the blog thread since the user previously viewed the thread (e.g., new comments indicator 416). Thus, for an active thread, a user will see a single entry in his/her e-mail inbox and an indication of the number of new comments to the thread (rather than multiple entries/e-mail messages for each update to the thread).

Some e-mail programs provide functionality for searching e-mail messages based on a text string input by the user. In some examples, when a user searches for messages in his/her e-mail (e.g., by entering a search term or string in box 418 and selecting the search mail option in block 420), the e-mail program can search both e-mails the user has sent/received as well as micro-blog threads that have been delivered to the user's inbox in the form of e-mail messages. The e-mail program can search both the e-mails and micro-blog threads because the e-mail server stores a static copy of the micro-blog thread in addition to the reference to the live content on the social networking server. As such, the e-mail application searches both the stored static e-mail messages and the stored static copy of the micro-blog threads in response to a user initiated search.

Figure 4B:
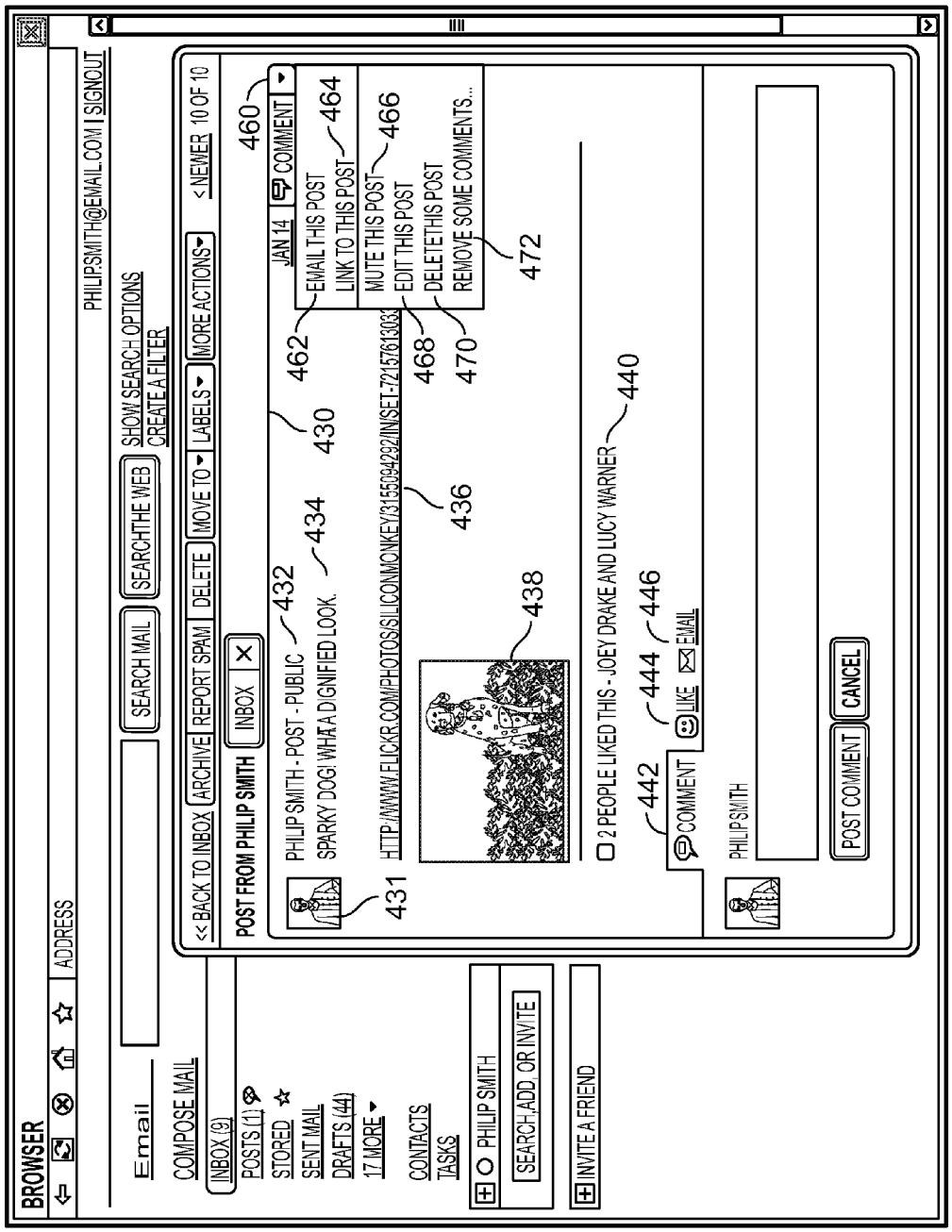
FIGS. 4B, 4C, and 4D show exemplary user interfaces for displaying active content from a micro-blog in an e-mail message.
Figure 4C:
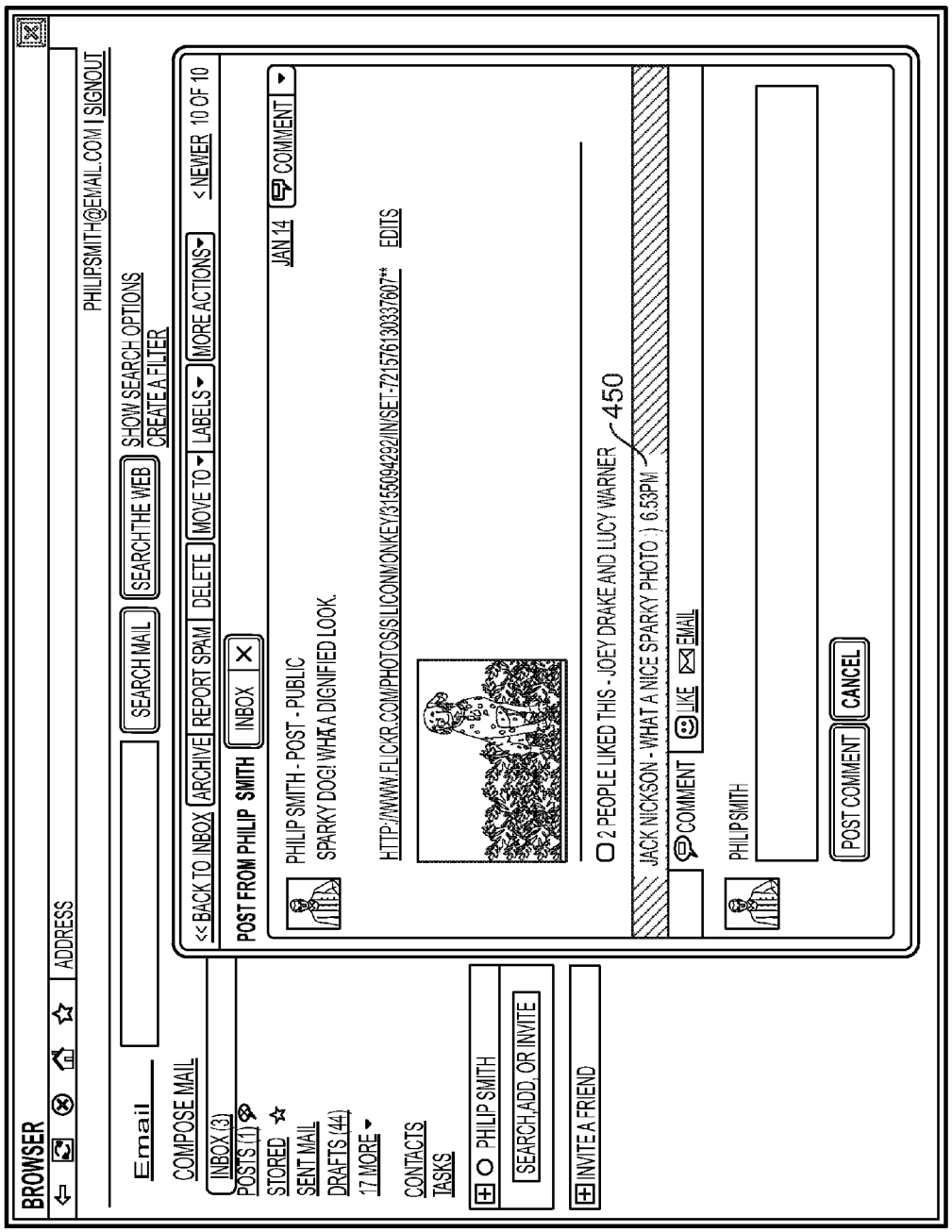
Figure 4D:
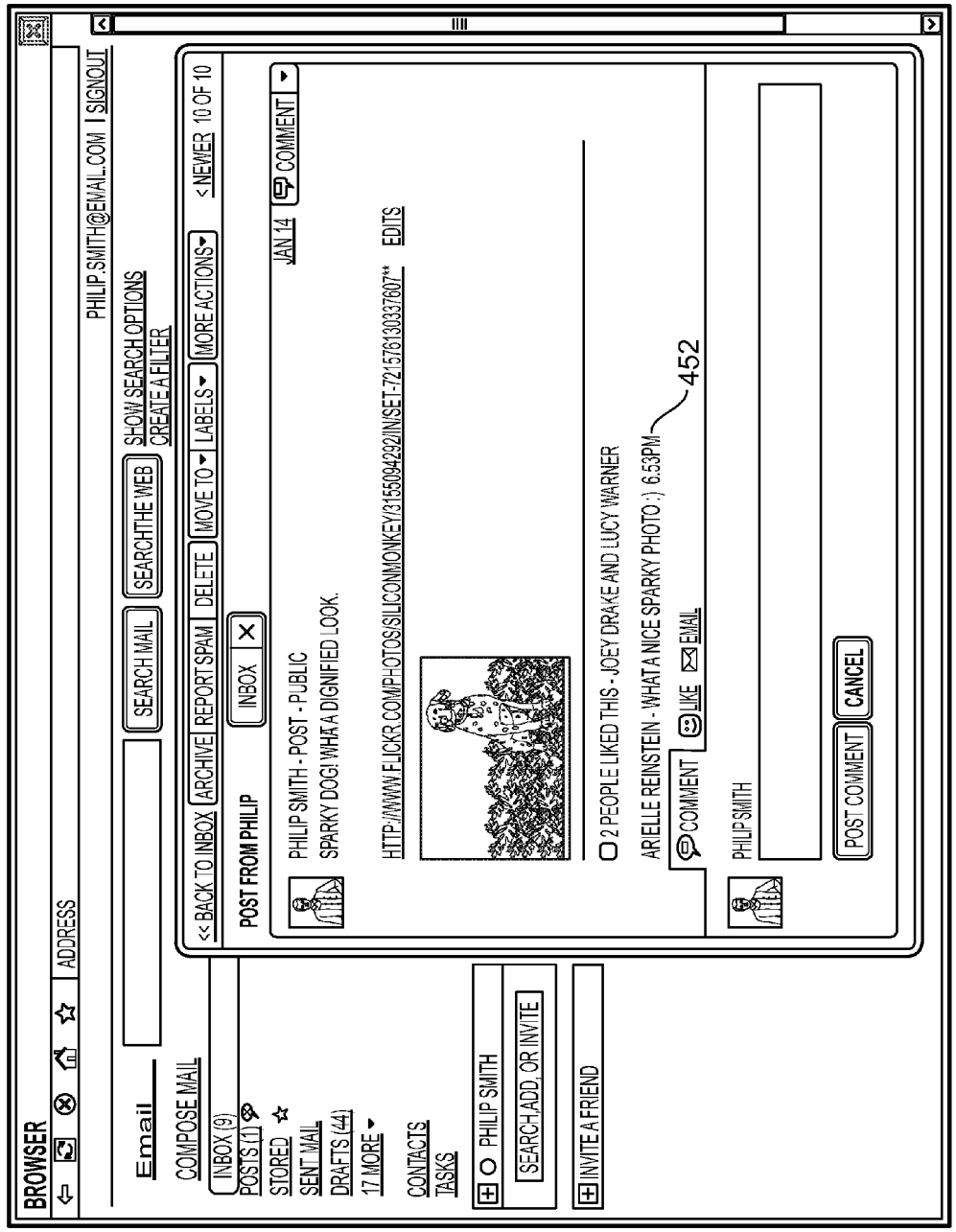

FIGS. 4B, 4C, and 4D show exemplary user interfaces for displaying active content in an e-mail message and updating the content based on activity in a micro-blog.

As shown in FIG. 4B, a thread from a micro-blog 436 with which the user is involved is delivered directly to the user's e-mail inbox in the form of an e-mail message. The user can interact with the thread in the same manner as he/she would interact with the thread on the micro-blog website. The user views the active micro-blog content by clicking on an entry (e.g., message 410 shown in FIG. 4A) in his/her e-mail. In response, the micro-blog thread is displayed as an e-mail message that includes the micro-blog content in the body of the e-mail message. The body of the e-mail message is rendered to have a similar look-and-feel as the micro-blog website. The e-mail message can include the name of the individual who started the thread 432 and a picture associated with that user 431. The e-mail also includes the text of the posting 434. If the posting includes additional content such as links to websites, pictures, videos, etc the additional content is also displayed within the e-mail. For example, the e-mail message 430 associated with Philip Smith's posting includes a link to another website 436. If the user clicks on the link to the website 436 in the e-mail, a new browser window is opened to display the website. When photographs are posted on a micro-blog, the e-mail message 430 delivered to the user's e-mail will include the photograph 438 inline with the body of the e-mail message. As such, the photograph can be viewed directly in the e-mail message rather than requiring the user to view the e-mail at the micro-blog website or at another website. Further, if a user posts a link to a website where multiple photographs are stored (e.g., flickr, shutterfly, zenfolio, etc) the micro-blog application can automatically retrieve one or more of the photographs included in the album and the photographs can be included in the micro-blog entry and in the e-mail message associated with the micro-blog entry.

When a user is viewing an e-mail message with a micro-blog thread, the content in the e-mail is active, live content and is updated in real time to reflect additions or changes in the micro-blog thread. As shown in FIG. 4C, when a user is viewing an e-mail message and an update is made to the micro-blog, the update is delivered in real time to the user's e-mail message. Upon delivery, the update can be highlighted by a visual and/or audio indicia. For example, as shown in FIG. 4C, an update to the thread shown in FIG. 4B made while the user was viewing the thread in the e-mail message is emphasized by highlighting the new comment 450 as it is delivered and first appears in the body of the e-mail message. Upon delivery, the new comment is appended to the end of the thread in the body of the e-mail message and displayed as an entry 452 in the thread in a similar fashion to the other posts in the thread, as shown in FIG. 4D.

Referring back to FIG. 4B, while actions of commenting on a post and liking a post directly from an e-mail message have been described above, additional actions can be taken by a user in response to receiving a message associated with a micro-blog thread. For example, the message 430 includes a drop down menu 460 of additional functionality with selection entries to e-mail the post 462, link to the post 464, mute the post 466, edit the post 468, delete the post 470, and/or remove some of the comments from the post 472.

If the user selects to e-mail the post 462, the user is prompted to enter one or more e-mail addresses for desired recipients of the post. When the user e-mails the post to another individual, the thread from the micro-blog is delivered to the individual's e-mail inbox and the individual will be able to view updates to the micro-blog posting directly from his/her e-mail.

If the user selects to link to the post 464, a URL associated with the thread in the micro-blog is provided to the user. The URL provides the web address for the thread in the micro-blog and allows a user to navigate a web browser to the micro-blog by directing the web browser to the URL address.

If the user selects to mute the post 466, the automatic updating of the e-mail message based on posts to the micro-blog is disabled for the particular post associated with the message. For example, if a user is involved in a post and receives the inbox email messages for the post, the user can opt out of email delivery by selecting to mute the post 466. When the user opts out, this information is transmitted to the social network server. The user is still maintained in the list of involved users, but the social network adds an annotation specifying that that user has opted out of the email delivery for that particular item.

If the user selects to edit the post 468, the user can make changes to his/her entries in the thread (e.g., make changes to the original post if he/she made the original post or make changes to a comment in the thread that he/she has posted). By allowing a user to easily edit a post in the micro-blog thread directly from his/her e-mail, a user can advantageously make corrections to the posting (e.g., to add or remove information, correct an error, etc.) without having to first delete the post and then make a new post and without having to navigate to the website associated with the micro-blog. Any edits made to the post in the e-mail inbox are reflected in the micro-blog.

If the user selects to delete the post 470, the post is removed from both the user's inbox and the micro-blog. If the user selects to remove some of the comments from the post 472, the user can select comments that he/she deems inappropriate and remove the comments. This allows the individual originally posting the thread to have some control over the comments added to the micro-blog thread in response to his/her original posting. The user can select comments to remove directly in the user's inbox and the comments are then removed both from the e-mail message associated with the thread and from the micro-blog itself.

Figure 4E:
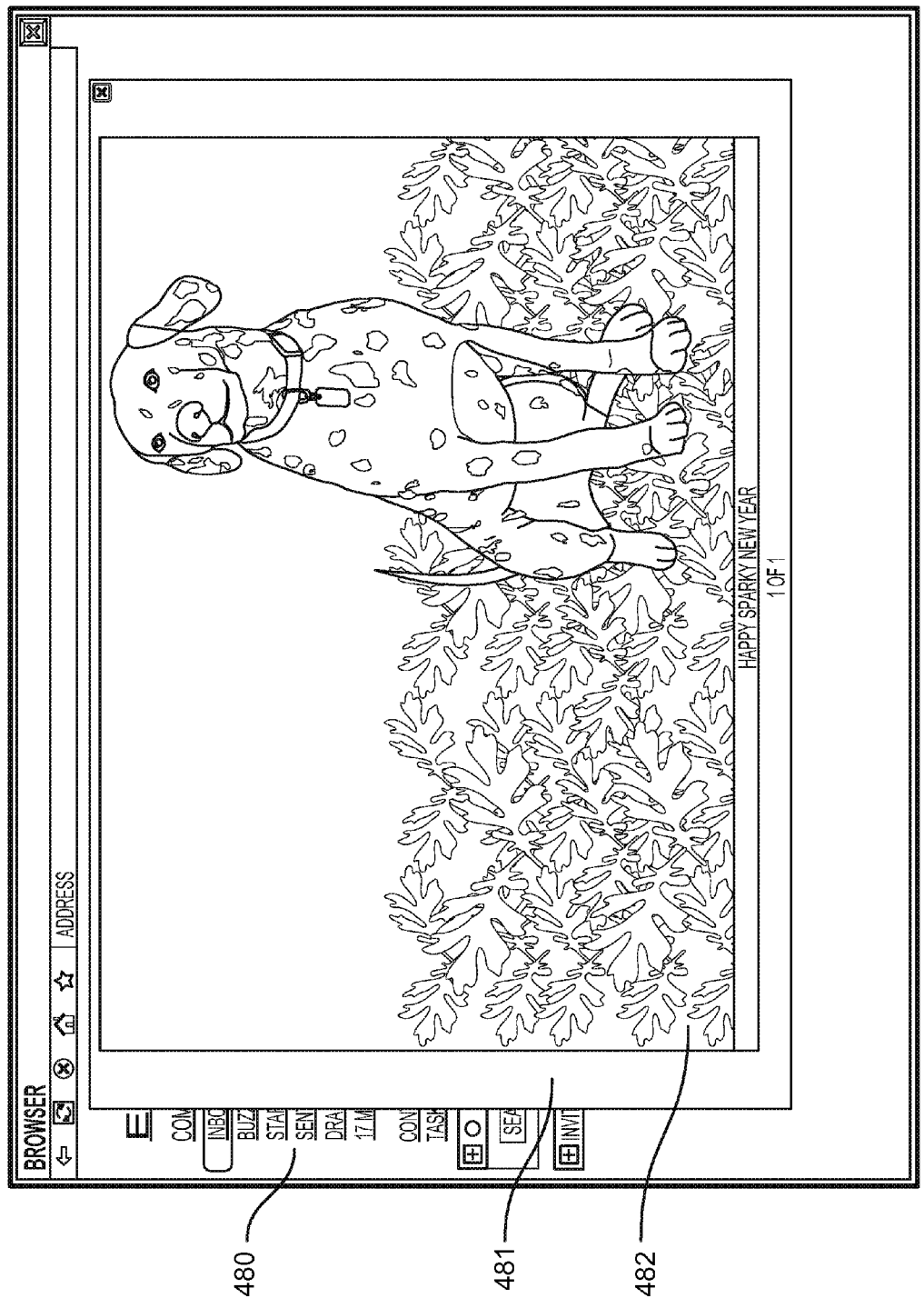
FIG. 4E is an exemplary user interface showing a photograph viewer.

Micro-blog entries often have images associated with the thread. As described above and shown, for example, in FIG. 4B, the images are displayed inline with the e-mail message. However, in some situations, a user may desire to view a larger copy of the image than is available inline with the e-mail message. The system enables a user to view a larger version of the image directly in the e-mail application without navigating to the micro-blog website or another website. In order to view the larger version, the user clicks on the image in the e-mail and a larger version of the image is displayed to the user. The image can be set apart from the e-mail application by a border or another visual indication. FIG. 4E is an exemplary user interface showing a photograph viewer where the photograph is viewed in an increased size in response to the user-selection. The photograph is set apart from the e-mail application by a border 481 and by graying out or otherwise de-emphasizing the e-mail application in the areas 480 surrounding the photograph. In order to return to the e-mail inbox, the user clicks on the background area 480 of the e-mail surrounding the image 482.

Micro-blog entries can also have videos associated with the thread. The videos are displayed inline with the e-mail message and the user can view the video from the e-mail message by clicking on the video. This allows the user to view the video without navigating to another website or opening another application.

Figure 4F:
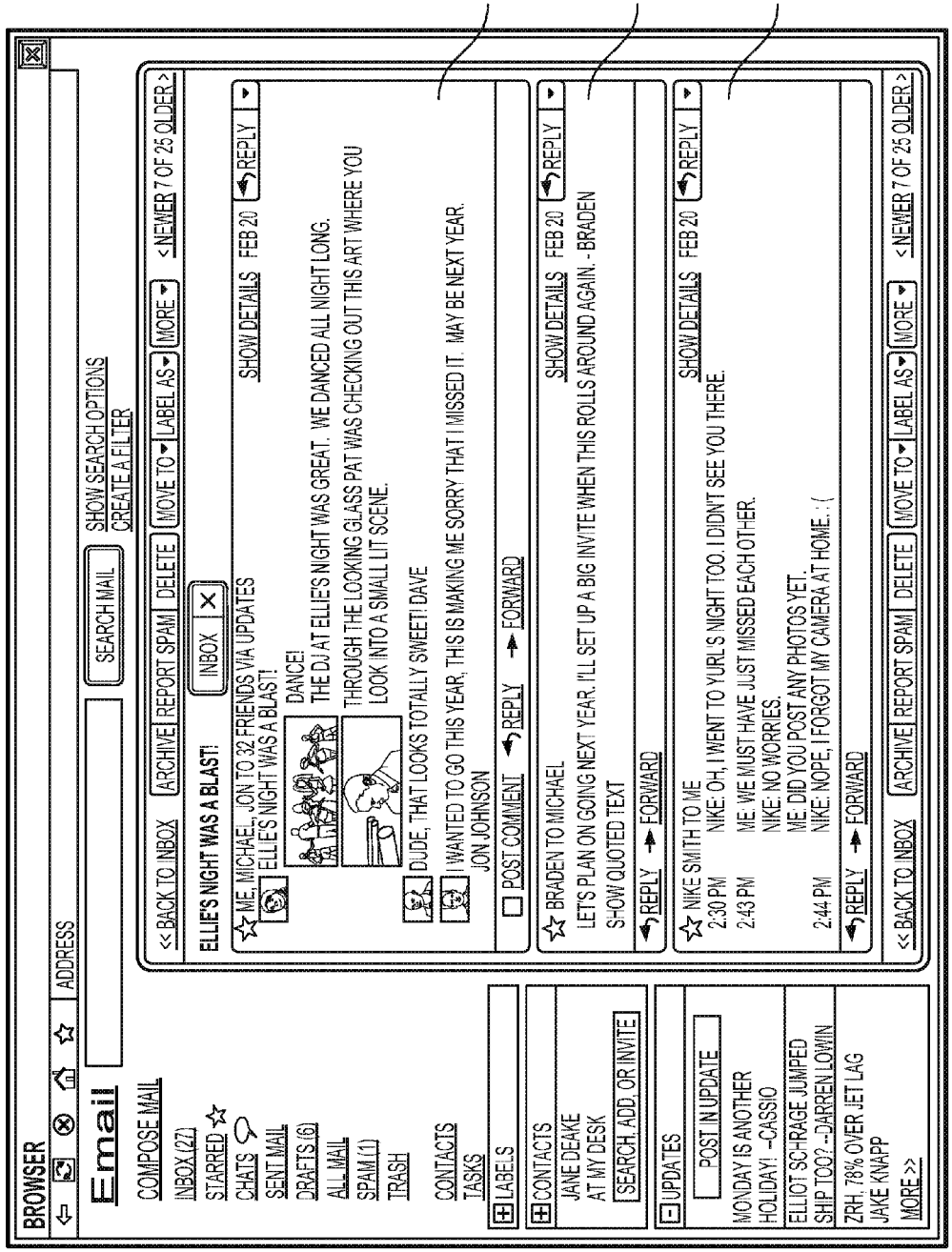
FIG. 4F is an exemplary user interface showing micro-blog postings, chat session transcripts, and e-mails associated with a micro-blog thread.

FIG. 4F is an exemplary user interface showing micro-blog postings 486, chat session transcripts 490, and e-mails 488 associated with a micro-blog thread all of which are grouped and displayed within a user's e-mail inbox. In addition to responding to a micro-blog thread by commenting or liking the micro-blog entry, a user can additionally respond to a poster via e-mail or chat. If a user responds to a micro-blog entry by e-mail, the e-mail message is grouped with the micro-blog e-mail message in the user's inbox as another card or entry. Additionally, when a user responds to a micro-blog entry by initiation of a chat session, a transcript of the chat session 490 (if produced) is stored and included as an entry in the user's inbox grouped with the other entries related to the micro-blog posting.

Figure 5:
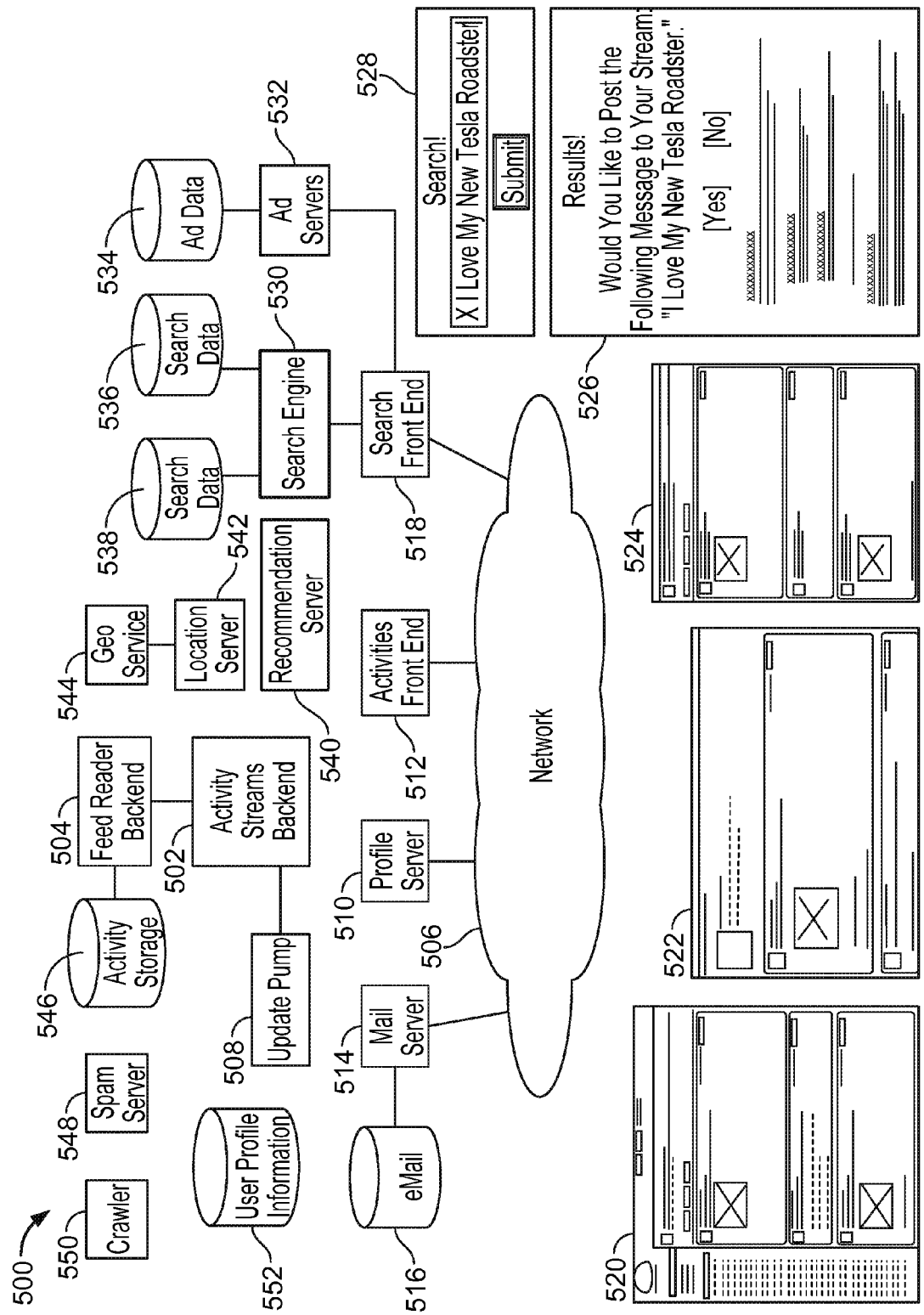
FIG. 5 is a block diagram of a system.

FIG. 5 is a schematic diagram of a system 500 within which the various features described in this document may be implemented. In general, the system 500 permits various users to post, review, and comment on various activity streams of information, within a social networking framework. For example, a user may make a micro-blogging post about a recent happening in the user's life or about a news article the user recently read. That post may be forwarded to other users who have chosen to follow the first user (who may be an individual or an organization). Those other users may see the post using a stream reader, or the post may be displayed in their email applications (e.g. either in line with their regular email messages or under a separate tab). Those users may choose to comment on the post, and other users may also comment on the post or comment on the comments of other users. Such comments may be included and shown in the various users email application even if they were made after the post was originally connected to the email application. Thus, the various types of feedback may be made available to each user conveniently in one place. Users may also see posts related to other users my visiting profile pages for those other users, and may also go to their own profile pages or to their stream pages to see all of the posts and comments for posts to which they are subscribed.

The various posts, and comments on posts, are managed in the system 500 by an activity streams backend 502, which is in charge of implementing business logic that defines the manner in which various submissions to the system 500 will be handled. The activity streams are characterized by activities, which are the subjects of posts (e.g., micro-blog posts) that users submit to the system 500, and various comments directed toward those activities. For example, a user may post an activity regarding a web page they are currently viewing by pasting a URL of the page into a posting page. Such action may cause the system 500 to gather important information form the URL, including images displayed on the page, headings, labels for images, or topical terms that describe a topic of the page (e.g., as previously determined by analysis of the words on the page, such as using ADSENSE analysis of the page). The system 500 may also obtain location information, such as the current location of the user, and/or a venue with which the user is most currently associated (e.g., that the user checked into recently or identified as a venue in which the user is located).

The activity streams back-end 502 also implements logic for determining what users are to receive posts, comments on posts, and other portions of streams in the system 500. In particular, users who have subscribed to receive posts form other users may be provided with posts when they log into the system 500, users may nominate other users to receive copies of streams when those other users would not ordinarily be included in the streams (e.g., by typing in identifiers for those other users when reviewing a post), and users may send streams directly to each other, among other things.

The feed reader back end 504 manages storage of posts and related data for the system 500. The feed reader back end 504 may rely on various levels of activity storage 546 to store posts, comments, on posts, and other information needed to construct streams for users when they request information from system 500. As with the other components shown in this figure, the feed reader back end 504, though shown as a single block, can be implemented using a number of different servers or server sub-systems Likewise, the activity storage 546 can be implemented across a number of databases and database types, and across a variety of servers and server subsystems.

When posts or other updates are received by the activity stream back-end 502, they are formatted and provided to update pump 508. The update pump 508 is responsible for provided notices about newly-posted information to various services that may need such information. It acts, in effect, as a router and distributor of information relating to the system 500. For example, a mail server 514 may include functionality for integrating the display of streams, and may thus need to know about new posts so that users of a mail client can be shown immediately when new information is posted. In a similar manner, a search engine 530 may provide search results to users that include real-time updating information from various posts that users are supplying to the system, and can receive such updated information by interacting with the update pump 508 via understood APIs and remote procedure calls (RPCs) where the two components are sub-components of a larger organization-wide system.

Various web front-ends are provided to permit the system 500 communicate over a network 506, such as the internet (and adjacent supporting networks). For example, the mail server 514 may provide typical web-based electronic mail functionality, though with the integration of posts and comments into users' in boxes, via a mail client 520. For example, streams may show up as discrete messages in user's in box, and may be updated in real time to include the latest comments on the streams and originating posts for the streams. Such content may be active, in that a user may be allowed to interact with it substantially to a level that they could if they were reviewing the streams in a dedicated stream reader. For example, selectable controls may be provided with a stream that is displayed by the email client 520, and a user may choose one in order to post a comment to be added to a stream, without having to leave the context of the message within the email client 520.

A profile server 510 generates code for representing user profiles such as profile 522 of user Joe Blow. The profile page may take the form of a standard feed page from a social networking site, arranged with a list of posts and comments from other users in reverse chronological order. In a similar manner, an activities front end 512 can generate a similar feed for a user's feed page 524, here for a user named Susie User. The profile page 522 and the feed page 524 may be very similar to each other, and can present content similar to that presented as part of a posting or micro-blogging section of mail client 520. In one example, the profile page 522 is what third parties see when they look at the user's account, while the feed page 524 is what the user himself or herself sees.

A search engine 530 and associated search front end 518 may provide a different sort of functionality for the system 500. Specifically, the search front end 518 may allow users to provide posts or comments from non-traditional sources, such as search boxes, e.g., on a search web page or in a search box on a toolbar installed on their machines an operating in concert with their web browsers. Such posts or comments may be submitted by users and may be received by the search front end in a standard manner, just as search requests are. The intent of a user to submit a post rather than a search query (or in addition to a search query) may be determined by syntactical analysis of the submission. In one example, if a query is preceded by the letter "z", with a space after it (see screen 528)—a construct that is seldom submitted as a real search query—the system may parse the submission apart and assume, from the syntax, that the user intends to post the remainder of the submitted query as a post to their social network.

Such a post may be made immediately or after confirming with the submitting user that they would like to make a posting. For example, a search results page 526 may be generated that contains actual search results for the submitted query (whether with or without the preceding "z") generated by the search engine 530 using data from index 538 in a conventional manner, and may be displayed below an area that shows the user the form of a proposed post and selectable controls by which the user can edit the post and can then confirm an intent to post the information to friends, followers, or others. The post may then be forwarded by the search front end 518 to the activity streams backend 502, along with identifying information for the user (e.g., a user ID identified from a cookie on the user's computing device when the user is logged onto a broader service that implements the system 500).

Other syntax submitted by a user may produce different results. For example, if a user enters an email address (e.g., of the form "name@domain.com"), the system may identify that syntax as indicating an intent to send the remaining text of the submission as an email message to the user at the provided email address. Likewise, if the user starts a submission with a control character followed by a communication mode identifier, the remainder of the submission may be submitted for posting in tat communication mode, either without or without first presenting the proposed action to the user and confirm that the user intends such a communication to occur. For example, if a user types "z blog I'm having a great time," the syntax may indicate to the system 500 that the user would like to post the submitted phrase "I'm having a good time" to the user's blog (where the identity of the blog may be determined by the system 500 using a user ID stored as a cookie on the user's computing device, and which can be correlated to an account for the user that is in turn correlated to the blog).

The search results and other information (e.g., posts and email messages) may be accompanied by targeted advertisements directed to the search query or other similar information, such as profile information, the text of posts or comments by a user, the text of posts or comments of users who have a relationship with a user (e.g., as friends, followers, or users that the first user follows). Such advertisements may be served, through the search front end 518, or the other front ends 510, 512, 514 to users of the system 500 and may be targeted using techniques like those employed in GOOGLE ADWORDS OR ADSENSE. Such serving of advertisements may depend on ad data in database 534, which may include information about advertisers, the text and other content for the advertisements, bid prices submitted by the various advertisers, and other relevant information needed to serves advertisements that are directed to users and/or streams of information directed from or to the users.

Various location-based services may be integrated with posts or comments, such as by identifying the locations (e.g., lat/long coordinates) or venues (e.g., stores, arenas, bars, or restaurants) from which posts or comments are made. Such services are provided in this example system 500 by a location server 542 and geo service 544. The location server 542 generally provides information about venues or other landmarks in response to receiving location information about a user of system 500. For example, when a user submits a post, geo-coordinates for the user may be provided with the post (e.g., via GPS functionality on the user's mobile computing device) or may be determined for the user by the system 500 (e.g., via cell tower or access point identification or triangulation). The geo-location information may be an estimated latitude and longitude of the mobile computing device and information identifying an accuracy of the estimation. The location server 542 may be made available through an API to various other components of the system 500.

The location server 542 may use such geo-location information to identify one or more venues (e.g., stores, restaurants, or bars) in the general location of the user, may use proximity of the user to each venue and other signals (e.g., popularity of each venue as determined from search queries submitted with the venue name, check-ins at the venue by users of the system 500, a volume of activity associated with posts from the venue, a reputation of a post's author, for example, through number of subscribers, a volume of comments on posts, or a similarly determined reputation of the subscribers) to provide a ranked list of venues in the geographic area that the user may be in. The user may be presented with a single suggestion for a venue or several suggested venues. The user may then select one such venue, and that venue may be associated with the post when other users review it. For example, the post may be accompanied by meta data indicating that the post was "Posted from Dive Bar," and other users may select the name "Dive Bar" to see additional information about the venue, including other posts from the venue, ratings of the venue, streams that belong to the venue (e.g., if a manager of the venue has made the venue a user of the system 500) and other similar information.

The location server 542 may obtain information that it needs to provide such functionality from various external services, such as geo service 544. Geo service 544 may be a service that communicates via standard APIs to receive location information (e.g., lat/long coordinates) and to provide more advanced information in response. The more advanced information may include a street address that is determined to be associated with the lat/long coordinates (e.g., a street address that is nearest to a particular location represented by the lat/long coordinates). The more advance information may also include a list of venue names that are geographically near the particular location, street addresses for the venues, descriptive information for the venues, map tiles that are associated with the particular location, and a relevance score for each venue. The relevance score for each venue may identify how relevant the particular venue is based on any combination of (i) the received location information, (ii) an accuracy of the received location information, and (iii) a distance between the venue and a location identified by the received location information.

Other components may interact with the components already described to provide additional functionality foe the system 500. For example, a crawler 550 may crawl various posts and comments for the purpose of indexing the content in the system 500, so that, for example, search engine 530 may readily deliver search results that include the latest postings by users to the system 500. Also, spam server 548 may communicate with the activity streams backend 502 and/or the update pump 508 to identify posts or comments that may be inappropriate (e.g., offensive, abusive, or otherwise inappropriate), duplicative, deceptive (e.g., in which one user poses as another user), and to act appropriately with respect to such content (e.g., providing for automatic and/or manual review of the content and perhaps removing the content from the system 500 or making the content hidden).

Finally, a recommendation server 540 may be provided with any new activity or post that is submitted to the system 500 (e.g., via the activity streams back-end 502). The recommendation server 540 may write back to the activity streams backend 502 about the number of people who should receive the activity. Such information may be saved so that the next time a message is sent out about the activity (e.g., a comment on the activity), the new recommended users also get the activity. A quality score can be computed when determining what users should receive an activity, and the score can be determined by factors such as the distance of relationship between a user and other users who have posted to or recommended an activity, interests of a user as identified in the user's profile (e.g., the user is a member of a classic cars group in a social network, and thus is more likely to receive notices about activities relating to classic cars), or interests as identified by posts or other submissions that the user makes, users or activities that the user follows, and the like. A quality threshold may be set by the recommendation server 540 in order to maintain an adequate level of recommendations (not too many and not too few).

Using the components described here, then, the system 500 may provided for integration of various modes of posting and receiving content that is provided in streams, such as microblog posts and comments on such posts. Users may post in various ways, including directly into search boxes on search pages or toolbars, so that such users may be more tightly integrated into systems provided by the providers of the pages or toolbars, and may provide posts in contexts with which they are already very familiar. Also, the users may review posts and other content in their email client, also in a manner that is already familiar to them and does not require them to leave a familiar application in order to review such posts. Moreover, the content may be rich for the users, such that it may include information about locations and venues at those locations (from which a reader of the content may obtain additional information, such as from hyperlinks provided in posts), and the users may respond to posts in-line, such as from their email applications. In all these, ways the system 500 may provide a communication facility that allows a user simpler and more complete interaction with friends and with other users, and may increase the level of knowledge that is made available to the users of the system 500.

Figure 6:
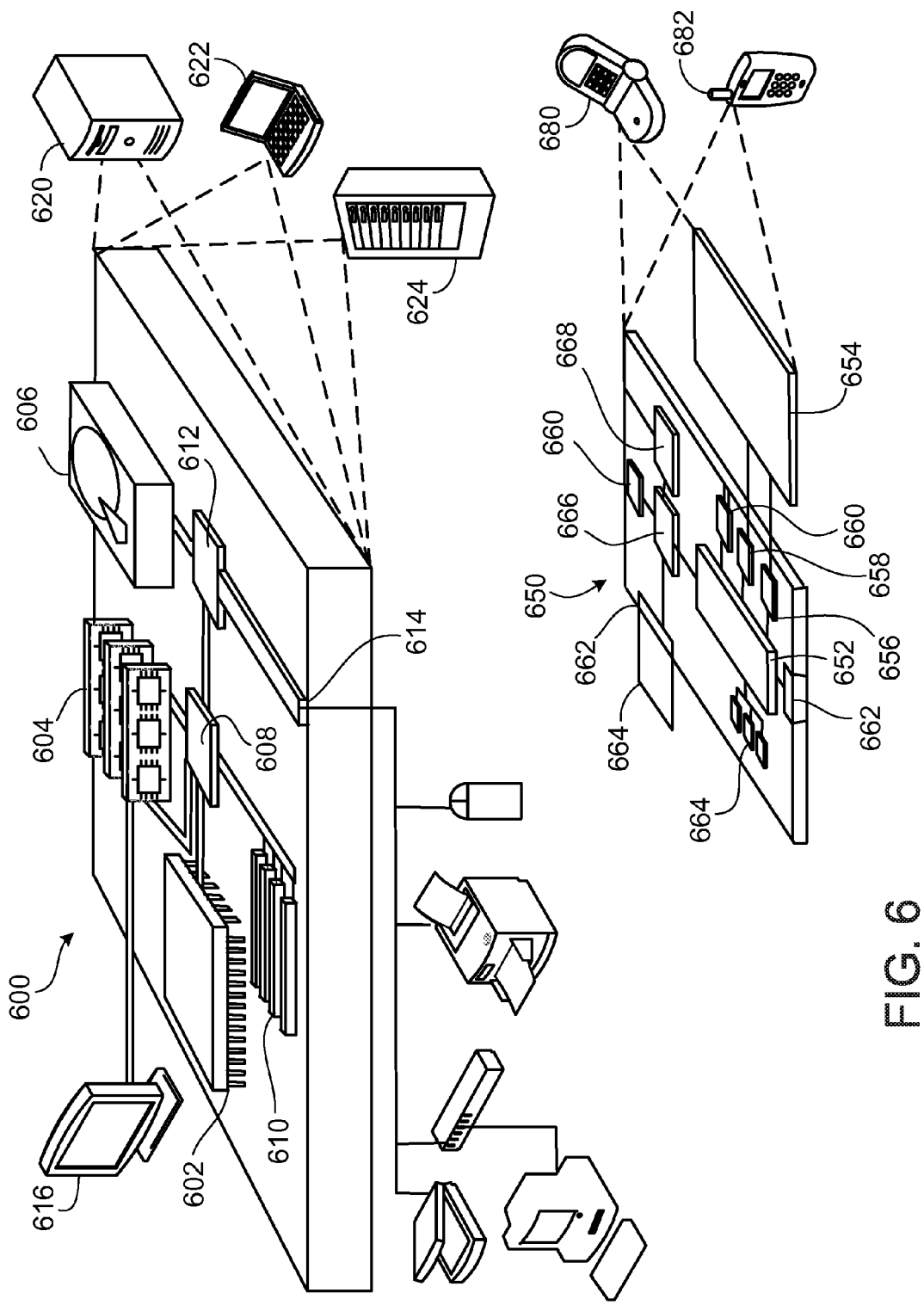
FIG. 6 is a block diagram of a system.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for displaying active content from a micro-blog and interacting with the micro-blog content from a user's e-mail may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method of delivering content from a micro-blog to an e-mail message in a user's e-mail, the method comprising:
   a client system providing an e-mail message associated with a thread in a micro-blog to a user's e-mail, the e-mail message including a first set of micro-blog entries;
   receiving a request from the user to view the e-mail message associated with the thread in the micro-blog;
   in response to the request, accessing the micro-blog to retrieve a real-time copy of the micro-blog thread;
   updating the body of the e-mail message based on the accessed real-time copy of the micro-blog thread to include a second set of micro-blog entries that includes updates to the micro-blog thread inline with one or more micro-blog entries included in the first set of micro-blog entries; and
   updating, in real time, micro-blog entries rendered in the e-mail based on updates to the thread in the micro-biog.

2. The method of claim 1, wherein the e-mail message includes an embedded dynamic object associated with the thread in the micro-blog and accessing the micro-blog comprises accessing the micro-blog based on the embedded dynamic object.

3. The method of claim 1, further comprising updating entries to the micro-blog thread based on received user input from the user's e-mail application.

4. The method of claim 1, wherein updating entries to the micro-blog thread based on received user input from the user's e-mail application comprises:
   providing a text entry box associated with the e-mail message;
   receiving a user input from the text entry box; and
   in response to the received user input, posting the received user input to the micro-blog.

5. The method of claim 4, further comprising, in response to a user selection of an image displaying an increased size view of the image.

6. The method of claim 5, further comprising receiving a search request from a user and searching micro-blog threads based on the received search.

7. The method of claim 1, wherein updating entries to the micro-blog thread based on received user input from the user's e-mail application comprises:
   providing a link in the e-mail message configured to enable a user to provide a 'like' indication by selection of the link;
   receiving a 'like' indication from the user; and
   posting the 'like' indication to the micro-blog.

8. The method of claim 1, further comprising enabling the user to view the video inline with the e-mail message.

9. The method of claim 1, further comprising displaying images associated with the micro-blog entry inline with the e-mail message.

10. The method of claim 1, further comprising filtering micro-blog entries to determine a subset of entries to deliver as e-mail messages to a particular user.

11. The method of claim 1, further comprising storing a static copy of the micro-blog thread.

12. An electronic system for delivering content from a micro-blog to an e-mail message in a user's e-mail, comprising:
   a memory; and
   a processor configured to:
      provide an e-mail message associated with a thread in a micro-blog to a user's e-mail, the e-mail message including a first set of micro-blog entries;
      receive a request from the user to view the e-mail message associated with the thread in the micro-blog;
      in response to the request, access the micro-blog to retrieve a real-time copy of the micro-blog thread;
      updating the body of the e-mail message based on the accessed real-time copy of the micro-blog thread to include a second set of micro-blog entries that includes updates to the micro-blog thread inline with one or more micro-blog entries included in the first set of micro-blog entries; and
      updating, in real time, micro-blog entries rendered in the e-mail based on updates to the thread in the micro-blog.

13. The system of claim 12, wherein the e-mail message includes an embedded dynamic object associated with the thread in the micro-blog and the processor is configured to access the micro-blog based on the embedded dynamic object.

14. The system of claim 12, wherein the processor is configured to update, in real time, micro-blog entries rendered in the e-mail based on updates to the thread in the micro-blog.

15. The system of claim 12, wherein the processor is configured to:
   provide a text entry box associated with the e-mail message;
   receive a user input from the text entry box; and
   in response to the received user input, post the received user input to the micro-blog.

16. The system of claim 12, wherein the processor is configured to:
   provide a link in the e-mail message configured to enable a user to provide a 'like' indication by selection of the link;
   receive a 'like' indication from the user; and
   in response to the received user input, post the 'like' indication to the micro-blog.

17. The system of claim 12, wherein the processor is configured to enable the user to view the video inline with the e-mail message.

18. The system of claim 12, wherein the processor is configured to store a static copy of the micro-blog thread and access the stored copy of the micro-blog thread in response to a search request.

19. A computer-implemented method comprising:
   providing an e-mail message associated with a thread in a micro-blog to a user's e-mail, the e-mail message including a micro-blog entry the email including two different e-mail parts including a first part configured to display static content and a second part configured to render interactive content, the e-mail message including a first set of micro-blog entries;
   generating a snippet view of the e-mail message based on the first part;
   receiving a request from the user to view the e-mail message associated with the thread in the micro-blog;
   in response to the request, accessing the micro-blog to retrieve a real-time copy of the micro-blog thread;
   updating the body of the e-mail message based on the accessed micro-blog to include a second set of micro-blog entries that includes updates to the micro-blog thread in line with one or more micro-blog entries included in the first set of micro-blog entries; and
   updating, in real time, micro-blog entries rendered in the e-mail based on updates to the thread in the micro-biog.

* * * * *